May 20, 1947. J. SABIN ET AL 2,420,726
PHOTOGRAPHER'S FILM NUMBERING BOX
Filed May 27, 1946

Inventors
John Sabin
Frank P. Peterson
By Hazard and Miller
Attorneys

Patented May 20, 1947

2,420,726

UNITED STATES PATENT OFFICE 2,420,726

PHOTOGRAPHER'S FILM NUMBERING BOX

John Sabin and Frank R. Peterson,
Los Angeles, Calif.

Application May 27, 1946, Serial No. 672,442

2 Claims. (Cl. 95—1.1)

This invention relates to a photographer's film or plate numbering box.

An object of the invention is to provide a device to which film or plate holders conventionally used by photographers may be applied either at the same time or shortly after the film or plate is exposed to take a picture and which will project on a small or marginal portion of the film a number or other identifying media to enable the film to be readily identified.

Another object of the invention is to provide a device having the above-mentioned characteristics which can be readily used to project on the film two numbers or other identifying media at different locations so that if the photographer in taking the pictures indulges in the common practice of splitting films or plates, that is, taking two pictures on adjoining sections of the film or plate, that the identification may be readily applied to both edges.

A further object of the invention is to provide a photographer's film or plate numbering box which is adapted to receive a conventional film or plate holder which is so designed as to cooperate therewith forming a suitable light trap or seal to prevent the picture from becoming light struck or fogged at the time that the number or other identifying media is projected thereon.

With the foregoing and other objects in view, which will be made manifest in the following detailed description and specifically pointed out in the appended claims, reference is had to the accompanying drawings for an illustrative embodiment of the invention, wherein:

Figure 1:
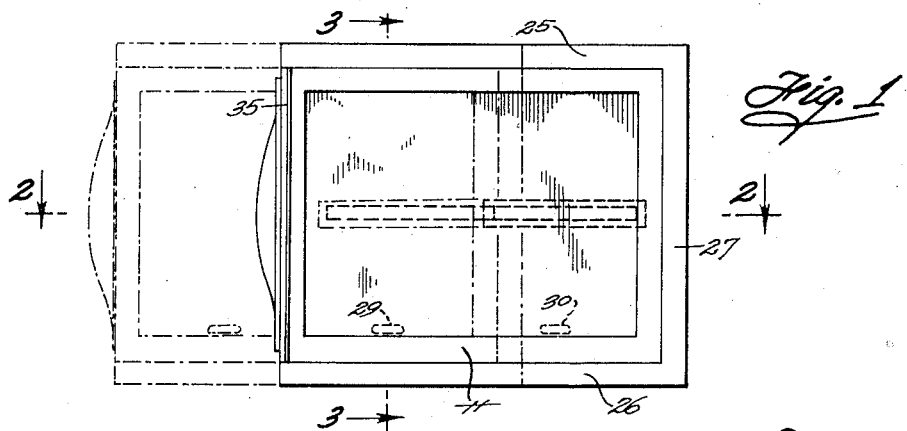
Figure 1 is a top plan view of the photographer's numbering box embodying the present invention and illustrating a film or plate holder in applied position thereon.
Figure 2:
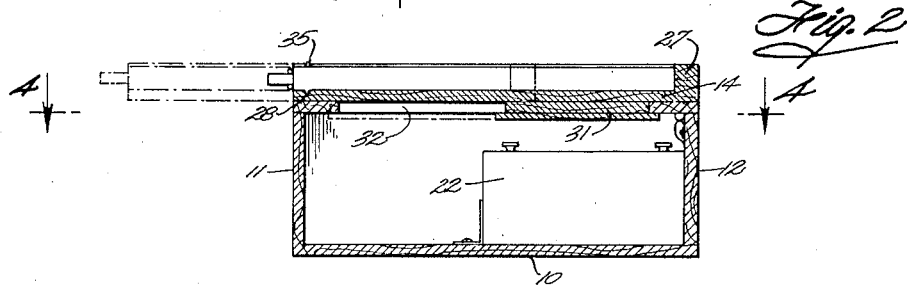
Fig. 2 is a vertical section taken substantially upon the line 2—2 upon Fig. 1.
Figure 3:
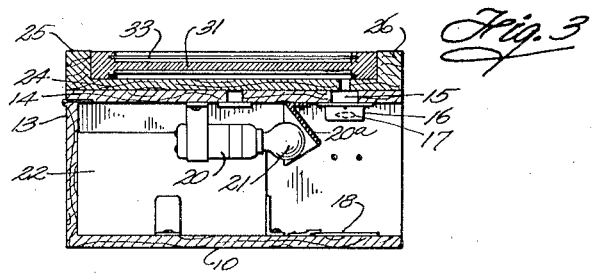
Fig. 3 is a vertical section taken substantially upon the line 3—3 upon Fig. 1.
Figure 4:
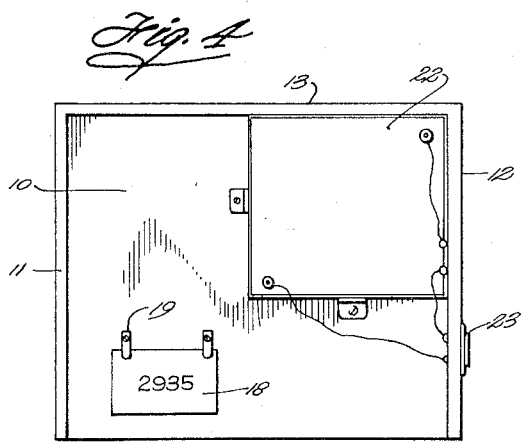
Fig. 4 is a horizontal section taken substantially upon the line 4—4 upon Fig. 2.

Referring to the accompanying drawings wherein similar reference characters designate similar parts throughout, the improved numbering box consists of a box-like structure having a bottom 10, end walls 11 and 12, and one side wall 13. The opposed side of the box that is opposite the side wall 13 is preferably left completely open. The top 14 is hinged to the top of the side wall 13 and has an aperture 15 therein somewhat displaced from the transverse center line through the box. Below this aperture there is a lens mounting 16 for a lens 17 that is arranged vertically over an area on the bottom 10 that is adapted to receive a card 18 held in place such as by clips 19. On the underside of the cover 14 there is mounted a socket 20 for an electric lamp 21 that may be energized by a replaceable dry cell 22 that is electrically connected thereto through a switch 23 preferably of the push button type which is located on the end wall 12. A shield 20a may be mounted on the underside of the cover to confine the light emanating from the lamp 21 onto the card 18.

On top of the cover 14 there is provided a recessed support or slide which has a bottom 24 and upstanding sides 25 and 26 joined by an upstanding end 27. On the opposite side of the bottom from the upstanding side 27 there is disposed a transversely extending groove 28. The recess in the slide is preferably of such size as to accommodate and receive a 5" x 7" film or plate holder as this is a popular size frequently used by photographers. However, the numbering box is in no way restricted to the size and even when so constructed it will readily accommodate smaller sizes of film or plate holders such as a 4" x 5" film or plate holder which is another popular size.

In the bottom 24 of the slide there are two apertures 29 and 30 either of which may be brought into registration with the aperture 15. These apertures are so located as to be disposed adjacent the marginal edge of the film or plate within the holder. The slide or support is retained on the cover 14 by means of an inverted T-shaped cleat 31 which is slidable in a longitudinally extending slot 32 formed in the cover. When the ends of the cleat 31 engage the ends of the slot 32 this limits the extreme movements of the slide and at these extremes one of the apertures 29 and 30 is in registration with the aperture 15. The conventional film or plate holder H has a central partition 33 on opposite sides of which films or plates may be positioned which are normally covered by slidable protective shields 34. These holders normally have small projecting ribs 35 thereon and the groove 28 formed in the bottom of the slide is of sufficient size as to readily receive these ribs or beads.

In using the numbering box the photographer proceeds to take his pictures using the film or plate holder H in the conventional manner. If the photographer has made out a number work ticket such work ticket may be positioned beneath the clips 19 to position its number beneath the lens 17. If no work ticket has been prepared an arbitrary number or even a small notation may be written on the card 18 and positioned beneath the clips. The film or plate holder is then positioned on the slide so that its lower rib or bead 35 if positioned in the groove 28 the film or plate holder is then crowded against the upstanding side 26 of the slide. While in this position the lower shield 34 is withdrawn sufficiently to expose the film over the aperture 29 and the push button switch is then momentarily closed to illuminate the electric lamp 21 thus illuminating the number or other identifying media on the card 18. The number is thus projected through the lens 17 onto the small marginal portion of the film which is exposed by the aperture 29 thus making a small permanent record on the film of the picture taken. If the photographer is in the practice of splitting films the shield may then be closed and the slide shifted to position the aperture 30 over the aperture 15 and the shield again withdrawn and the process repeated, thus applying the number or identifying media to both halves of the film or plate. If the film is subsequently cut into its two halves the number that is projected thereon is permanently associated with each half.

Normally the sides of the holder H fit sufficiently close to the bottom 24 of the slide as to prevent entry of the extraneous light at the time that the shield 24 is withdrawn. The entry of the rib or bead 35 into the groove 28 allows the holder to rest flatly on the bottom 24 of the slide and also forms a type of light shield or light trap preventing the film or plate from becoming light struck or fogged.

From the above-described construction it will be appreciated that immediately after the film has been exposed or at any suitable time thereafter the holder H may be applied to the slide and a work card or other card 18 inserted beneath the clips 19. By merely withdrawing the shield 34 temporarily a sufficient distance to expose the portion of the film over the aperture 29 or 30 as the case may be and momentarily closing the switch 23 a permanent record is made on the film associating the film with the work ticket or if numbers are arbitrarily applied to the card 18 a separate memorandum may be made of the significance of the numbers that are recorded on the film so as to properly identify it. When smaller sized film holders are used these are merely positioned on the slide so that their ribs or beads 35 enter the groove 28 and they are then crowded against the side 26 so as to properly position the marginal portions of the film over the aperture 29.

Various changes may be made in the details of construction without departing from the spirit and scope of the invention as defined by the appended claims.

We claim:

1. A photographer's film numbering box comprising means providing an apertured panel on which a film or plate holder may be positioned, a number holder arranged opposite the aperture, a lens for projecting the number on the number holder through the aperture onto the portion of the plate or film exposed through the aperture, said panel being slidable between limits and having a second aperture adapted to be positioned opposite the lens.

2. A photographer's numbering box comprising a box-like structure having a number holder mounted in the bottom thereof, means for illuminating a number placed on the number holder, a support over the number holder adapted to have a film or plate holder applied thereto and there being an aperture in the support, and a lens for projecting the number through the aperture onto the film or plate positioned thereon, said support being slidable between limits and having a second aperture adapted to be positioned opposite the lens.

JOHN SABIN.
FRANK R. PETERSON.

REFERENCES CITED

The following references are of record in the file of this patent:

UNITED STATES PATENTS

| Number | Name | Date |
| --- | --- | --- |
| 2,366,804 | Ramey | Jan. 9, 1945 |
| 2,146,920 | Strem | Feb. 14, 1939 |